(12) United States Patent
Malapel et al.

(10) Patent No.: US 8,505,429 B2
(45) Date of Patent: Aug. 13, 2013

(54) DEVICE FOR SEPARATING THE TWO PORTIONS OF A LAUNCHER REFUELING MODULE

(75) Inventors: Aliénor Malapel, Blandy les Tours (FR); Mickaël Deschamps, Vernon (FR); Georges Verdier, Tourny (FR); Jean-Luc Pattyn, Gaillon (FR)

(73) Assignee: Snecma, Paris (FR)

( * ) Notice: Subject to any disclaimer, the term of this patent is extended or adjusted under 35 U.S.C. 154(b) by 7 days.

(21) Appl. No.: 13/262,304

(22) PCT Filed: Mar. 30, 2010

(86) PCT No.: PCT/FR2010/050595
§ 371 (c)(1),
(2), (4) Date: Dec. 6, 2011

(87) PCT Pub. No.: WO2010/112764
PCT Pub. Date: Oct. 7, 2010

(65) Prior Publication Data
US 2012/0132060 A1 May 31, 2012

(30) Foreign Application Priority Data
Mar. 31, 2009 (FR) ...................................... 09 52016

(51) Int. Cl.
*F41F 3/055* (2006.01)
(52) U.S. Cl.
USPC ........................................................ 89/1.811
(58) Field of Classification Search
USPC ............ 89/1.811, 1.815, 1.806, 1.812, 1.814, 89/1.816, 1.819
See application file for complete search history.

(56) References Cited

U.S. PATENT DOCUMENTS

| 2,533,640 A | * | 12/1950 | Ulrich ...................... 137/614.04 |
| 2,962,934 A | * | 12/1960 | Seidner ........................ 89/1.819 |
| 3,242,811 A | | 3/1966 | Swet |

FOREIGN PATENT DOCUMENTS

| EP | 0371867 | 6/1990 |
| FR | 2685903 | 7/1993 |

* cited by examiner

*Primary Examiner* — Michael Carone
*Assistant Examiner* — John D Cooper
(74) *Attorney, Agent, or Firm* — Preti Flaherty Beliveau & Pachios LLP

(57) ABSTRACT

The invention relates to a separator device for separating the on-board and ground portions of a launcher fueling module, the device comprising: a locking system having a locking finger (50) mounted on the ground portion (22) and having a blocking portion (523), and a locking pin (42) on the on-board portion (21) co-operating by engaging with the blocking portion (523) in order to hold the on-board portion (21) and the ground portion (22) in a locking position. The separator system further comprises an actuation system that, under vertical movement of the launcher (10), enables the blocking portion (523) to be disengaged from the locking pin (42), whereby the on-board portion (21) is suitable for being separated from the ground portion (22). The invention also provides a method of separating the on-board and ground portions of a launcher fueling module, which method is implemented by means of such a separator device.

20 Claims, 8 Drawing Sheets

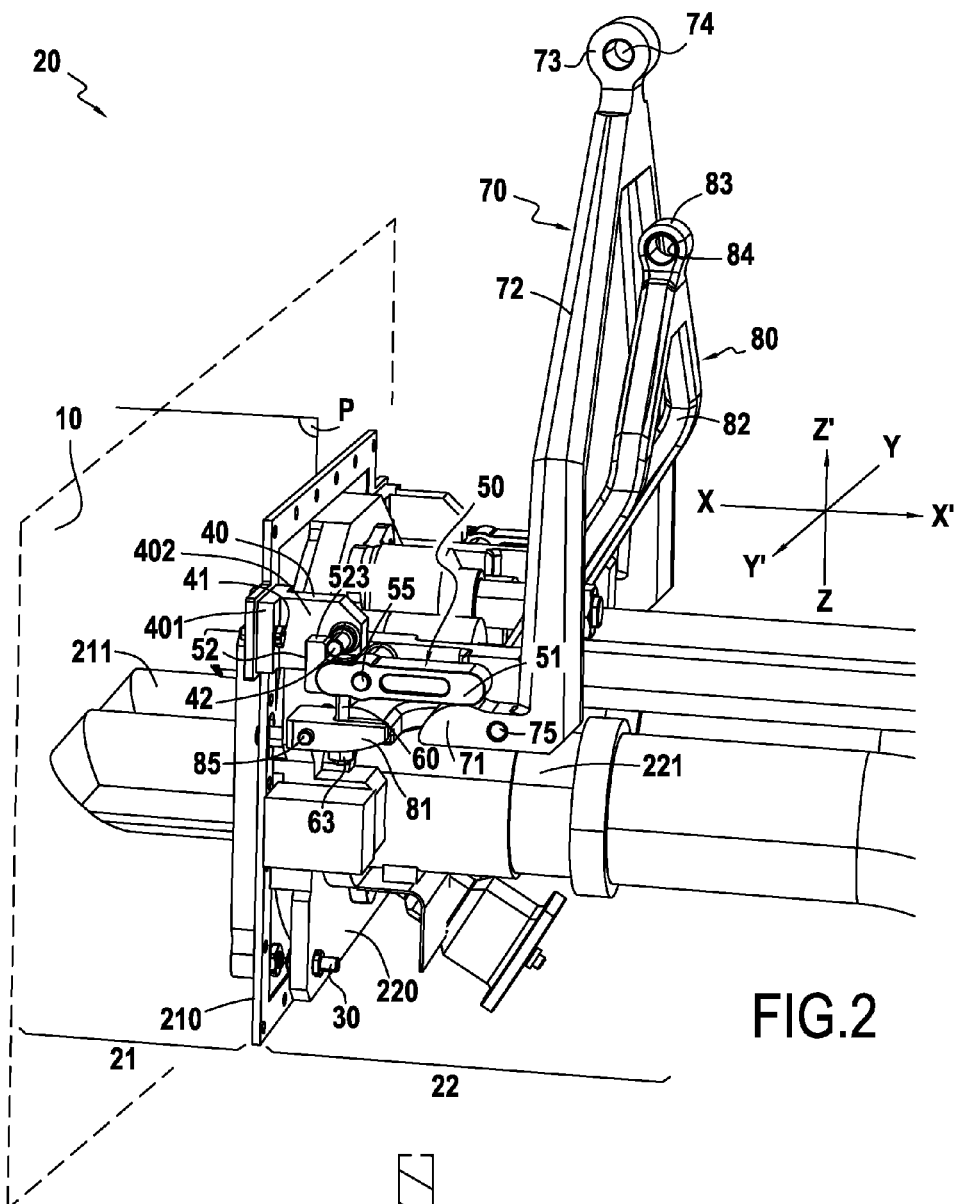
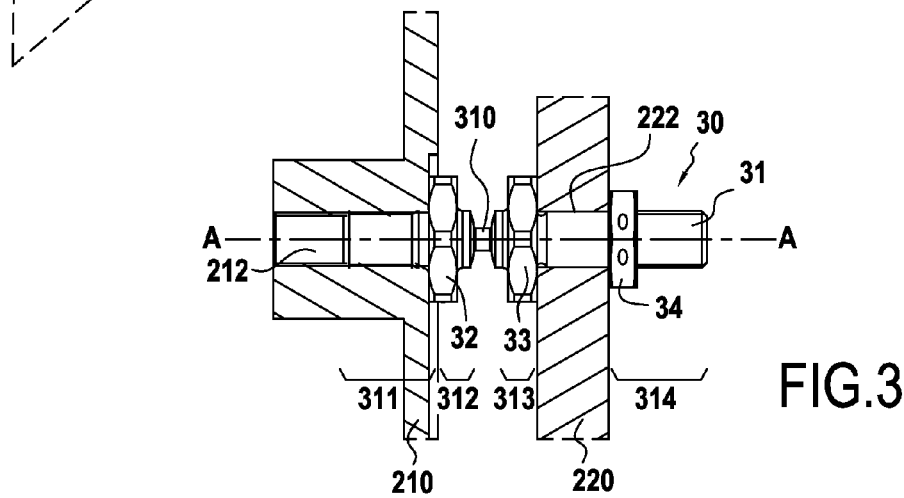
FIG.2
FIG.3

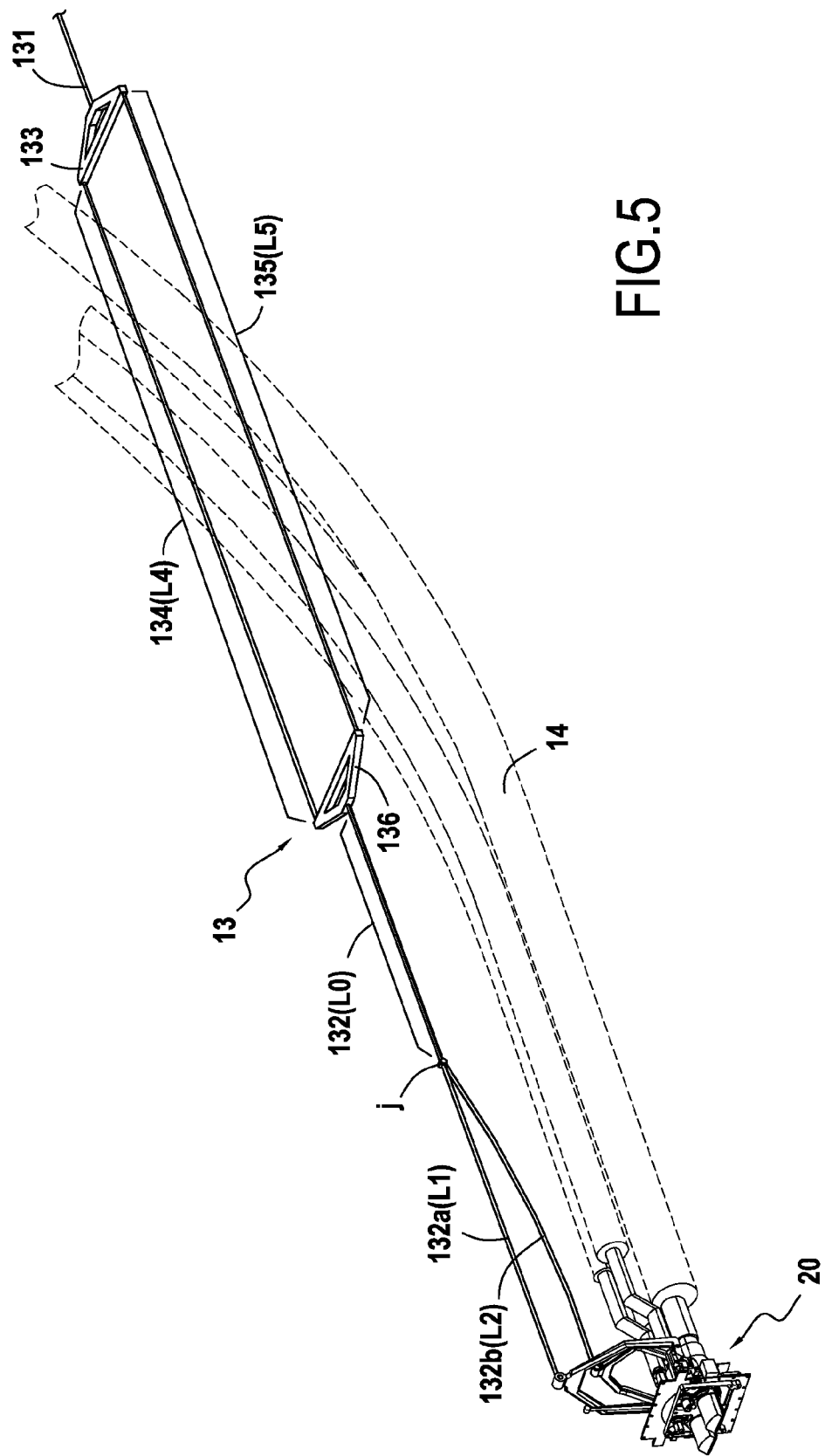

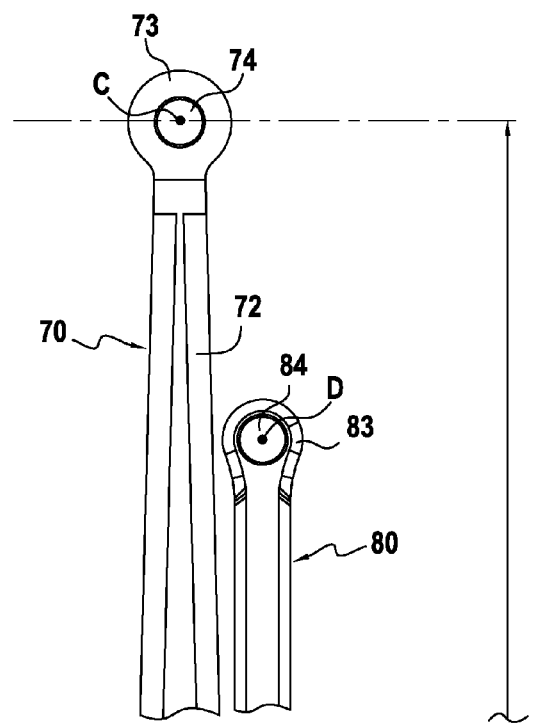
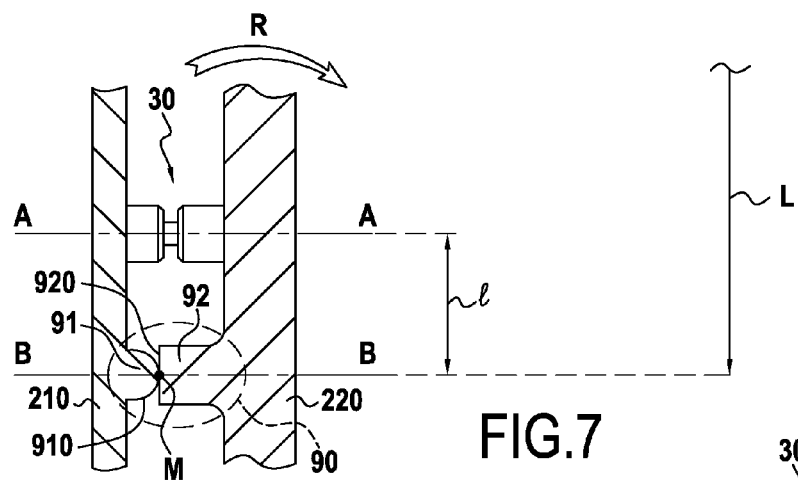
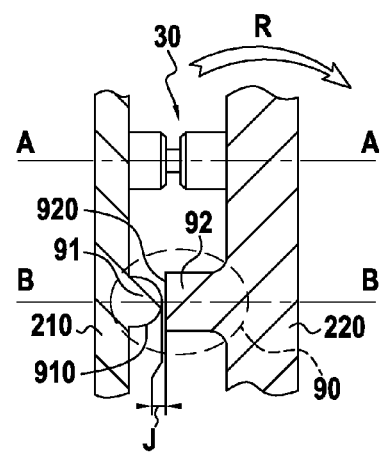

DEVICE FOR SEPARATING THE TWO PORTIONS OF A LAUNCHER REFUELING MODULE

The invention relates to a device for separating the on-board and ground portions of a launcher fueling module. More particularly, the invention relates to a device enabling the on-board and ground portions of the launcher fueling module to be separated after the launcher has begun its vertical movement.

BACKGROUND OF THE INVENTION

Launchers are fed with propellants via fueling modules that are constituted by an on-board portion connected to the launcher and by a ground portion connected to the launch pad. Those two portions must be suitable for separating after the launcher has been fueled, so as to avoid impeding vertical movement of the launcher.

Known systems for separating the on-board and ground portions of a fueling module, also referred to as valve plates, make use of helium actuators or of solenoid valves that are actuated by systems involving electrical commands coming from the launcher or from the launch pad. Such electrical commands can be delivered by the launch pad or by the launcher only before the thrust engines have ignited, such that the on-board and ground portions of the fueling module need to be separated before such ignition, during a "negative countdown" period. Consequently, it is essential to ensure and verify successful separation of the on-board and ground portions of the fueling module before the launcher begins to lift off. Furthermore, in the event of a launch being aborted, in particular in the event of an engine breaking down, it is necessary to empty the tank via an emergency module that presents reduced performance and that is slower, thereby subjecting other equipment of the launcher to additional stress. Finally, the valve plates operate irreversibly, which makes it essential for them to be replaced before beginning another launch countdown.

Known systems thus present major drawbacks in terms of costs and efficiency.

OBJECTS AND SUMMARY OF THE INVENTION

The present invention seeks to simplify known devices for separating on-board and ground portions of the fueling module of a launcher, and to limit the constraints associated with separating these module portions in the event of a launch being aborted.

Firstly, this object is achieved with a separator device for separating the on-board and ground portions of a launcher fueling module, by virtue of the fact that it comprises: a locking system having a locking finger mounted on the ground portion and having a blocking portion, and a locking pin on the on-board portion co-operating by engaging with the blocking portion in order to hold the on-board portion and the ground portion in a locking position; together with an actuation system that, under vertical movement of the launcher, enables the blocking portion to be disengaged from the locking pin, whereby the on-board portion is suitable for being separated from the ground portion, and also by virtue of the fact that said actuation system comprises a first actuator and a second actuator, the second actuator being actuated after the first actuator.

By means of these provisions, the on-board and ground portions of the fueling module are disconnected under the effect of the launcher moving vertically, i.e. after its propulsion engines have ignited. Thus, in the event of the engines failing or in the event of a launch being aborted, the on-board and ground portions remain connected to each other and can be used once more for a subsequent launch. There is therefore no need to empty the tanks, nor to replace a portion of the fueling module, as occurs with presently-known techniques.

In an advantageous aspect of the invention, the second actuator alone serves to disengage the blocking portion from the locking pin, thereby constituting a safety element enabling the two portions of the launcher fueling module to be separated. Since the second actuator is actuated after the first, it constitutes a safety element ensuring that the two portions of the fueling module are separated, even in the event of the first actuator malfunctioning or jamming. The separator device for separating the on-board and ground portions of the fueling module is thus more reliable.

In an aspect of the invention, the first and second actuators are capable, independently of each other, of disengaging the blocking portion from the locking pin.

In an aspect of the invention, the actuation system comprises a drive lever pivotally mounted on the ground portion, and the locking finger is pivotally mounted on the ground portion, the pivoting of the lever being suitable for driving pivoting of the locking finger, thereby disengaging the blocking portion from the locking pin secured to the on-board portion.

In another aspect of the invention, the locking finger is constituted by a first segment mounted on the ground portion and a second segment including said blocking portion, the first and second segments being connected together by means of a connection element.

In another aspect of the invention, the actuation system includes an extraction lever pivotally mounted on the ground portion and including a fork co-operating with the connection element of the locking finger in such a manner as to force movement of the connection element during actuation of the extraction lever and to extract the connection element from the locking finger, whereby the first and second segments of the locking finger can be separated from each other.

In an advantageous provision, the fork has a slot in which a middle portion of the connection element is engaged, and the connection element is breakable or removable and includes at its bottom end an enlarged end portion projecting at the underside of the fork.

In another aspect of the invention, the actuation system is connected to the launch pad via a cable, and is suitable for being actuated under the effect of traction from the cable when the launcher moves vertically through a predetermined distance. The separator device of the invention is actuated mechanically, thus enabling it to be actuated after the propulsion engines have started.

In an advantageous aspect of the invention, the first actuation means are in the form of a drive lever, and the second actuation means are in the form of an extraction lever.

In an embodiment, the drive lever is pivotally mounted on the ground portion and the locking finger is constituted by a first segment pivotally mounted on the ground portion and a second segment including said blocking portion, the first and second segments being connected together by means of a connection element. The pivoting of the drive lever is suitable for driving pivoting of the locking finger, thereby disengaging the blocking portion from the locking pin. The extraction lever is pivotally mounted on the ground portion and includes a fork co-operating with the connection element of the locking finger in such a manner as to force vertical movement of the connection element during actuation of the extraction lever and to extract the connection element from the locking finger, whereby the first and second segments of the locking finger can be separated from each other.

In an aspect of the invention, the fork has a slot in which a middle portion of the connection element is engaged; and the connection element is breakable or removable and includes, at its bottom end, an enlarged end portion projecting at the underside of the fork, actuation of the extraction lever enabling the connection element to be extracted from the locking finger and thereby releasing the connection between the second segment of the locking finger and the ground portion of the module.

For example, the connection element may be a bolt. The enlarged end portion may then be constituted by a nut screwed onto the bottom end of said bolt.

Advantageously, the bolt includes a head serving to position it between the two segments of the locking finger and suitable for being broken when the bolt is extracted from the locking finger.

In another aspect of the invention, the bottom surface of the fork of the extraction lever has a rounded shape, enabling the connection element to pivot in the event of the drive lever being actuated before the extraction lever is actuated.

In another aspect of the invention, the separator device includes a system for positioning the on-board and ground portions of the module relative to each other, said system being in the form of support shear pins fastened to the two portions of the module and suitable for being broken during separation of the two portions of the module. Furthermore, a pivot zone may also be provided at the bottom portions of the on-board and ground portions, said pivot zone comprising a first pivot portion formed on the on-board portion and a second pivot portion formed on the ground portion, with contact between the first and second pivot portions enabling pivoting and/or relative movement in translation of the ground portion relative to the on-board portion of the module.

The invention also provides a method of separating the on-board and ground portions of a launcher fueling module by means of the separator system of the invention, the method comprising the following steps:

a) initiating vertical movement of the launcher;

b) engaging the actuation system under the effect of the launcher moving vertically;

c) disengaging the blocking portion from the locking pin; and d) continuing vertical movement of the launcher, whereby the on-board and ground portions of the module are separated.

In order to engage the actuation system and disengage the blocking portion from the locking pin, it is possible for example to actuate the drive lever under the effect of the traction force from the cable when the launcher has lifted off through a predetermined distance (step e), and then to cause the locking finger to pivot sufficiently to disengage the blocking portion from the locking axis (step f).

In a variant of the method, it is possible to actuate the extraction lever under the effect of the traction force from the cable when the launcher has lifted off through a predetermined distance (step g), and then to force the movement of the connection element by pivoting the extraction lever until the connection element is fully withdrawn from the locking finger (step h).

In another aspect, the invention provides a method of separating the on-board and ground portions of a launcher fueling module by means of a separator system as described above, the method comprising the following steps:

a) initiating vertical movement of the launcher;

e) actuating the drive lever under the effect of the traction force from the cable when the launcher has lifted off through a first predetermined distance, so as to cause the locking finger to pivot;

g) actuating the extraction lever under the effect of the traction force from the cable when the launcher has lifted off through a predetermined distance higher than the first distance;

h) forcing the connection element to move by pivoting the extraction lever until the connection element is fully withdrawn from the locking finger; and d) continuing the vertical movement of the launcher, whereby the on-board and ground portions of the module are separated.

BRIEF DESCRIPTION OF THE DRAWINGS

The invention can be well understood and its advantages appear better on reading the following detailed description of an embodiment of the invention given with reference to the accompanying drawings, in which:

FIG. 2 shows the launcher fueling module, including a device for separating the on-board and ground portions of the module of the invention;

FIG. 3 shows a support shear pin housed between the on-board and ground portions of the launcher fueling module;

FIG. 5 shows the set of cables connecting the ground portion of the fueling module to the launch pad;

FIG. 7 shows a pivot zone of a launcher fueling module including an on-board and ground portion separator device of the invention; and FIG. 8 shows a variant of the pivot zone of a launcher fueling module including an on-board and ground portion separator device of the invention.

MORE DETAILED DESCRIPTION

Figure 1:
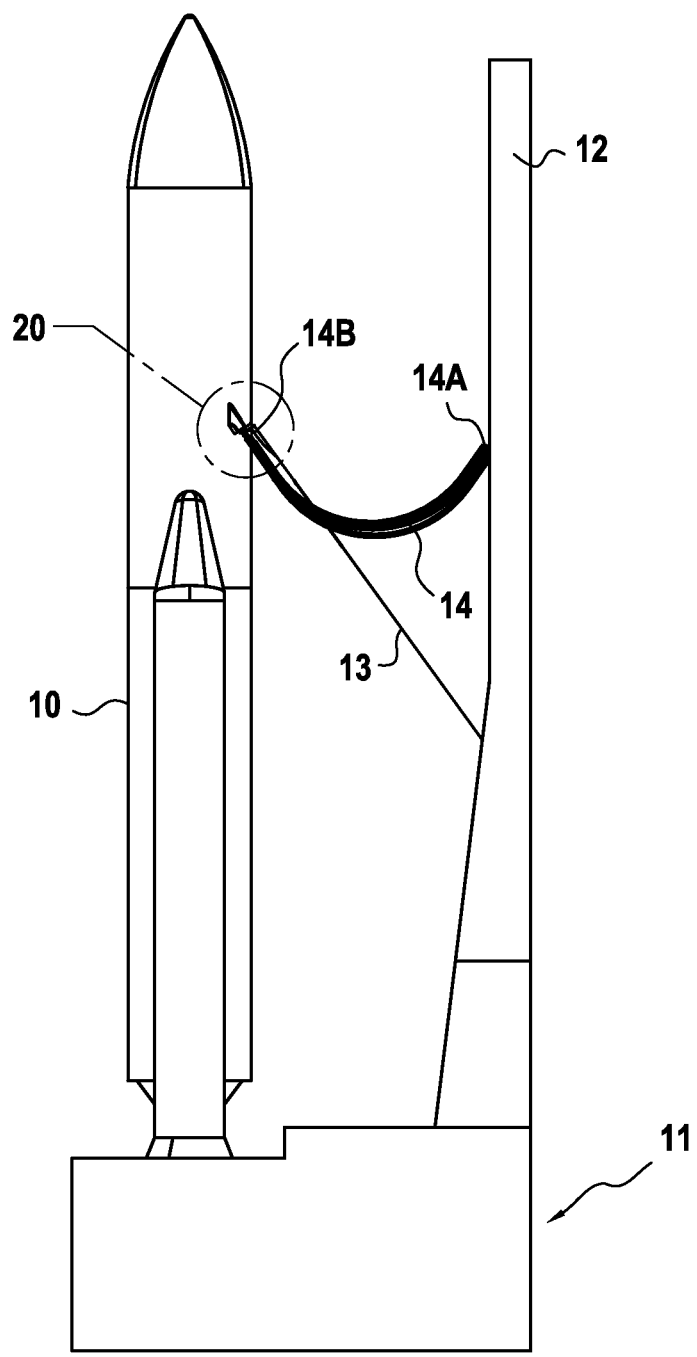
FIG. 1 shows a launcher provided with a separator device of the present invention.

FIG. 1 shows a launcher 10 mounted on a launch pad 11 and connected to a mast 12 of the launch pad 11 via a set of cables 13 and via umbilicals 14 that are for feeding the tanks of the launcher with propellant. The set of cables 13 is described in greater detail below with reference to FIG. 5. The umbilicals 14 are connected at their end 14A to a feed line (not shown) situated in the mast 12 of the launch pad 11, and at their end 14B to a fueling module 20 of the launcher 10.

For reasons of simplification, the fueling module 20 is referred to below merely as the "module".

The module is generally described below with reference to one of its sides relative to the midplane P shown in FIG. 2. It will readily be understood that all of its characteristics can be reproduced on the opposite side of the module when it is symmetrical about the plane P.

As shown in FIG. 2, the fueling module 20 of the launcher 10 comprises a first portion 21 referred to as the "on-board" portion, that is securely fastened to the launcher 10, and a second portion 22 that is referred to as the "ground" portion that is connected to the mast 12 of the launch pad 11 via the set of cables 13 and umbilicals 14. The on-board portion 21 of the fueling module 20 includes a substantially plane part referred to as the "on-board support" plate 210 that is bolted to the outer fairing of the launcher 10, and feed ducts 211 for feeding the tanks of the launcher. The ground portion 22 of the module 20 comprises a substantially plane part referred to as the "ground support plate" 220 together with cylindrical sleeves 221 to which the umbilicals 14 are fastened.

When the fueling module 20 is in its working position, the ground support plate 220 is situated facing the on-board support plate 210 and the on-board and ground portions 21 and 22 of the module 20 are locked together. One or more systems are provided for holding the ground support plate 220 and the on-board support plate 210 in relative position. For example, a peg (not shown) situated on the ground support plate 220 co-operates with a housing (not shown) of complementary shape situated in the on-board support plate 210.

Furthermore, in the bottom portion of the module, the on-board and ground portions 21 and 22 of the module 20 are held in position via support shear pins 30 that are fastened to the on-board and ground support plates and that serve to keep said plates substantially parallel.

A support shear pin 30 is shown in detail in FIG. 3. It is constituted by a shank 31 that has a plurality of threaded portions and that is fastened to the on-board support plate 210 and to the ground support plate 220.

At its first end, the shank 31 has a first threaded portion 311 that is screwed into a threaded hole 212 in the on-board support plate 210. The shank 31 is held in position by a first nut 32 screwed onto a second threaded portion 312 of the shank 31. In a variant embodiment of the invention, the shank 31 and the nut 32 are formed together as a single piece.

The opposite end of the shank 31 passes through a hole 222 formed in the ground support plate 220. The ground support plate 220 is held in position relative to the on-board support plate 210 by means of a nut 33 that is screwed onto a threaded portion 313 of the shank 31 situated facing the on-board support plate 210, and by means of a clamping nut 34 that is screwed onto a threaded portion 314 of the shank 31 situated on the side of the ground support plate 220 that faces towards the outside of the module 20. In a variant embodiment of the invention, the shank 31 and the nut 33 comprise a single piece. The first and second nuts 32 and 33 are preferably hexagonal nuts and suitable for being adjusted by means of a wrench. The single-piece variants enable assembly to be performed without adjustment, with the distance between the on-board and ground support plates 210 and 220 being predefined. This type of variant requires good control over the clearances between the parts in order to minimize the consequences of any static redundancy (acceptable levels of deformation for the parts).

The shank 31 also includes a narrow portion referred to as a "rupture zone" 310 that is designed to break when the two portions of the module separate. This rupture zone 310 is situated on the intermediate portion of the shear pin situated between the two support plates 210 and 220. This intermediate portion constitutes an access zone for a wrench, making it possible to adjust the parallel relationship and the clearance between the on-board and ground support plates of the module 20 by means of the nuts 32 and 33 without straining the rupture zone 310 in twisting. When the shank 31 and the two nuts 32 and 33 form a one-piece unit, the on-board and ground portions of the module are assembled together by tightening said one-piece unit on the on-board portion 21, by bringing the ground support plate 220 up to the on-board support plate 210 until both plates come into contact with the nuts 32 and 33 respectively, and finally by passing a first wrench into the rupture zone 310 in order to hold the single-piece unit in position without stressing said zone 310, while using a second wrench to tighten the nut 34.

In the top portion of the module, the on-board and ground portions 21 and 22 of the module 20 are held by a locking system comprising a locking pin and a blocking portion capable of co-operating by engagement in order to hold the on-board portion 21 and the ground portion 22 in a locked-together position. In particular, this engagement prevents any movement in translation of the ground portion of the module relative to the on-board portion in the direction X-X' defined in FIG. 2. The locking system is sufficiently robust to ensure that the two portions of the module are held in position during waiting and fueling stages. When fueling has been completed and the launcher has lifted off through a predetermined height, the locking system is released by a mechanical actuation system that serves to separate the two portions of the fueling module, the system being actuated under the effect of traction forces on the set of cables.

The locking system is described below with reference to FIGS. 2 and 4.

Figure 4:
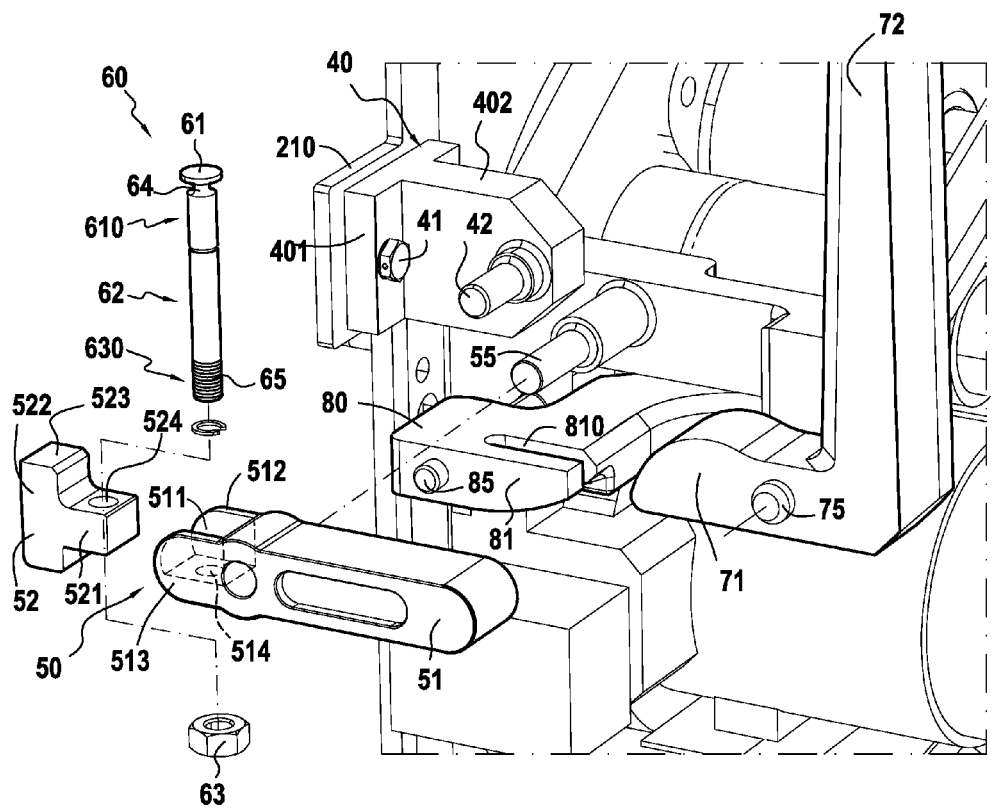
FIG. 4 is an exploded view of the locking system of the separator device of the present invention.

As shown in FIGS. 2 and 4, a locking pin support 40 is fastened to the on-board support plate 210. The locking pin support 40 is a T-shaped element having a transverse portion 401 fastened to the on-board support plate 210 via an adjustment screw 41, and a longitudinal portion 402 provided with a locking pin 42 at its distal end on its side face facing towards the outside of the module 20, the locking pin 42 projecting in a direction Y-Y' that is substantially perpendicular to the plane of symmetry P of the fueling module 20.

In addition, as shown in FIG. 4, the locking system includes a locking finger 50 mounted to turn on the ground portion 22 of the fueling module 20. The locking finger 50 is constituted by a first segment 51 that is pivotally mounted on a pin 55 of the ground portion 22 of the fueling module 20, and a second segment 52 including a blocking portion 523 for co-operating with the locking pin 42 that is secured to the on-board portion, so long as the module is in its locked position. The first segment 51 of the locking pin 50 is approximately in the shape of a rectangular block having a housing 511 formed therein by extrusion. The housing 511 is defined in its bottom portion by a bottom surface portion 513 of the first segment 51 and on its side by two fork-forming side portions 512. The second segment 52 of the locking finger 50 comprises a longitudinal portion 521 suitable for being received in the housing 511 between the fork portions 512 and extended by a transverse portion 522 having one end that forms the blocking portion 523. The first segment 51 and the second segment 52 of the locking finger 50 are connected together by a through pin 60 passing through a hole 514 provided in the bottom surface portion 513 of the housing 511 of the first segment 51, and a hole 524 formed in the longitudinal portion 521 of the second portion 52, the holes 514 and 524 being situated facing each other when the two segments of the locking finger are assembled together.

The blocking portion 523 of the locking finger 50 co-operates by engaging the locking pin 42 of the on-board portion 21 of the module 20. When the blocking portion 523 and the locking pin 42 are in contact, they prevent any movement in translation of the ground portion 22 relative to the on-board portion in the direction X-X'. The adjustment screws 41 that fasten the locking pin support 40 enable contact between the locking pin 42 and the locking finger 50 to be ensured and thus they enable the on-board and ground portions of the module 20 to be locked together, while avoiding any mounting under stress. It should be observed that the adjustment portion of the locking may be adjusted in this example by a spring washer or a wedge system.

The actuation system of the separator device for separating the on-board and ground portions of the fueling module is described below with reference to FIGS. 2, 4, and 5.

FIG. 2 shows the device for separating the on-board and ground portions of the module 20 in a locked position that enables the tanks to be fueled. The actuation system comprises a drive lever 70 pivotally mounted on the ground portion 22 of the module about a pin 75 that is parallel to the direction Y-Y' and that serves, on being actuated, to cause the locking finger 50 of the locking system to pivot so as to disengage the blocking portion 523 from the locking pin 42. The drive lever 70 has a short head 71 having a rounded profile over at least that portion of its periphery that comes into contact with the bottom portion of the locking finger 50 during the stage in which the drive lever 70 is actuated. This rounded portion serves to conserve contact with the locking finger 50 until the pin 42 has been fully released relative to the blocking portion 523 during pivoting of the drive lever 70. The drive lever 70 also includes a drive-lever stick 72 extending substantially perpendicularly to the lever head 71, together with a drive-lever knob 73 having an orifice 74 for attaching a traction cable of the set of cables 13 connected to the mast 12 of the launch pad 11. The drive lever 70 may be actuated under the effect of traction forces from the set of cables 13 once the launcher has lifted off through a sufficient first height H1.

The system for actuating the device for separating the on-board and ground portions of the fueling module also includes an extraction lever 80 pivotally mounted about a pin 85 of the ground portion 22. As shown in FIGS. 2 and 4, the extraction lever 80 includes a fork 81 at a first end, the fork having a slot 810 formed therein. The extraction lever 80 also includes, at its other end, an extraction-lever stick 82 that is inclined relative to the fork 810, together with an extraction-lever knob 83 that presents an orifice 84 for fastening a traction cable of the set of cables 13 that is connected to the mast 12 of the launch pad 11. In a manner similar to the drive lever, the extraction lever may be actuated under the effect of traction forces from the set of cables 13 once the launcher has lifted off through a second height H2.

The extraction lever 80 and the locking finger 50 co-operate via the bolt 60 connecting together the segments 51 and 52 of the locking finger 50. The top end portion 610 of the bolt 60 co-operates with the segments 51 and 52 of the locking finger 50. It further includes a head 61 enabling it to be properly positioned through the locking finger 50. The top end portion 610 of the bolt 60 is extended under the locking finger 50 by a middle portion 62 for co-operating with the slot 810 of the fork 81. Finally, in the embodiment shown in FIG. 2, a nut 63 is screwed onto the bottom end portion 630 of the bolt 60, which portion has a complementary thread 65. It should be observed that the middle portion 62 of the bolt 60 extends, after assembly (cf. FIG. 2 or 6A), between the bottom of the locking finger 50 and the bottom of the fork 81. In other variant embodiments of the invention, any other equivalent system could be used having a nut 63 that forms an obstacle and that enables the bolt 60 to be driven in vertical movement during actuation of the extraction lever 80.

The drive and extraction levers 70 and 80 are connected to the mast 12 of the launch pad 11 via the set of cables 13. When the launcher lifts off, the cables in the set of cables 13 become tensioned, thereby actuating the levers so that the locking system is unblocked, thereby allowing the on-board and ground portions of the module 20 to separate.

The set of cables 13 connecting the fueling module to the mast of the launch pad is shown in detail in FIG. 5. A first main cable 131 connected directly to the mast 12 of the launch pad 11 is connected to a first U-shaped guide 133. One lateral end of this U-shaped guide 133 is connected to a first intermediate cable 134 of length L4. The other lateral end of the guide is connected to a second intermediate cable 135 of length L5 equal to L4. The intermediate cables 134 and 135 are connected to respective lateral ends of a second U-shaped guide 136. The second U-shaped guide 136 is connected to a second main cable 132 of length L0 that is separated at a junction point J into two cable segments 132a and 132b. The first cable segment 132a has a length L1 and is connected to the orifice 74 provided for this purpose in the knob 73 of the drive lever 70. The second segment 132b has a length L2 and is connected to the orifice 84 provided for this purpose in the knob 83 of the extraction lever 80. The lengths L1 and L2 depend on the distance between the orifices 74 and 84 in the levers 70 and 80 to which the cables 132a and 132b are fastened and on the minimum lift-off distances H1 and H2 of the launcher. In a variant embodiment of the invention, two distinct cables are used, one being connected directly from the mast 12 of the launch pad 11 to the knob 73 of the drive lever 70, and the other being connected directly from the mast 12 to the knob 83 of the extraction lever 80.

Figure 6A:
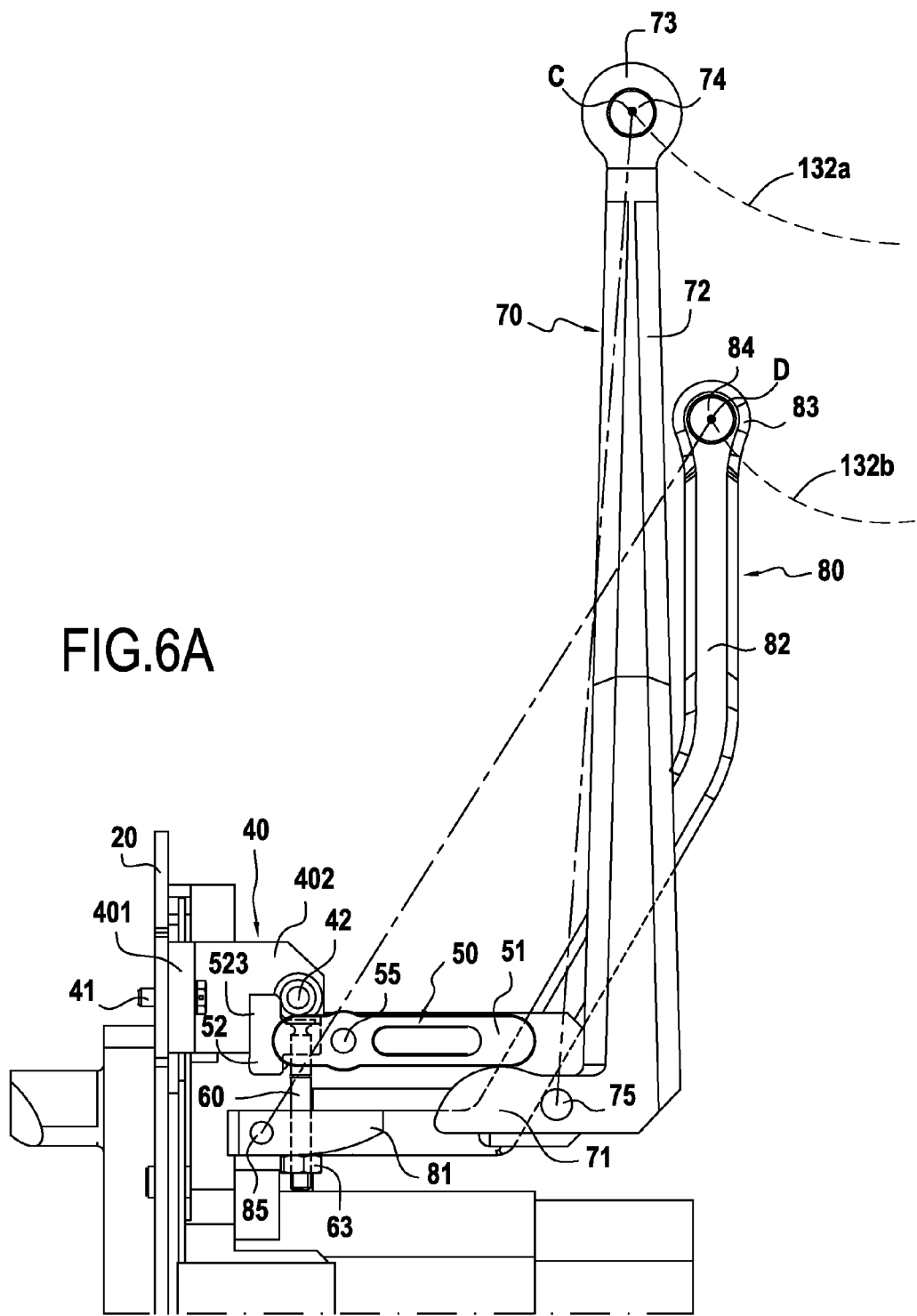
FIGS. 6A to 6C show the various steps in the operation of the system for actuating the separator device of the invention.
Figure 6B:
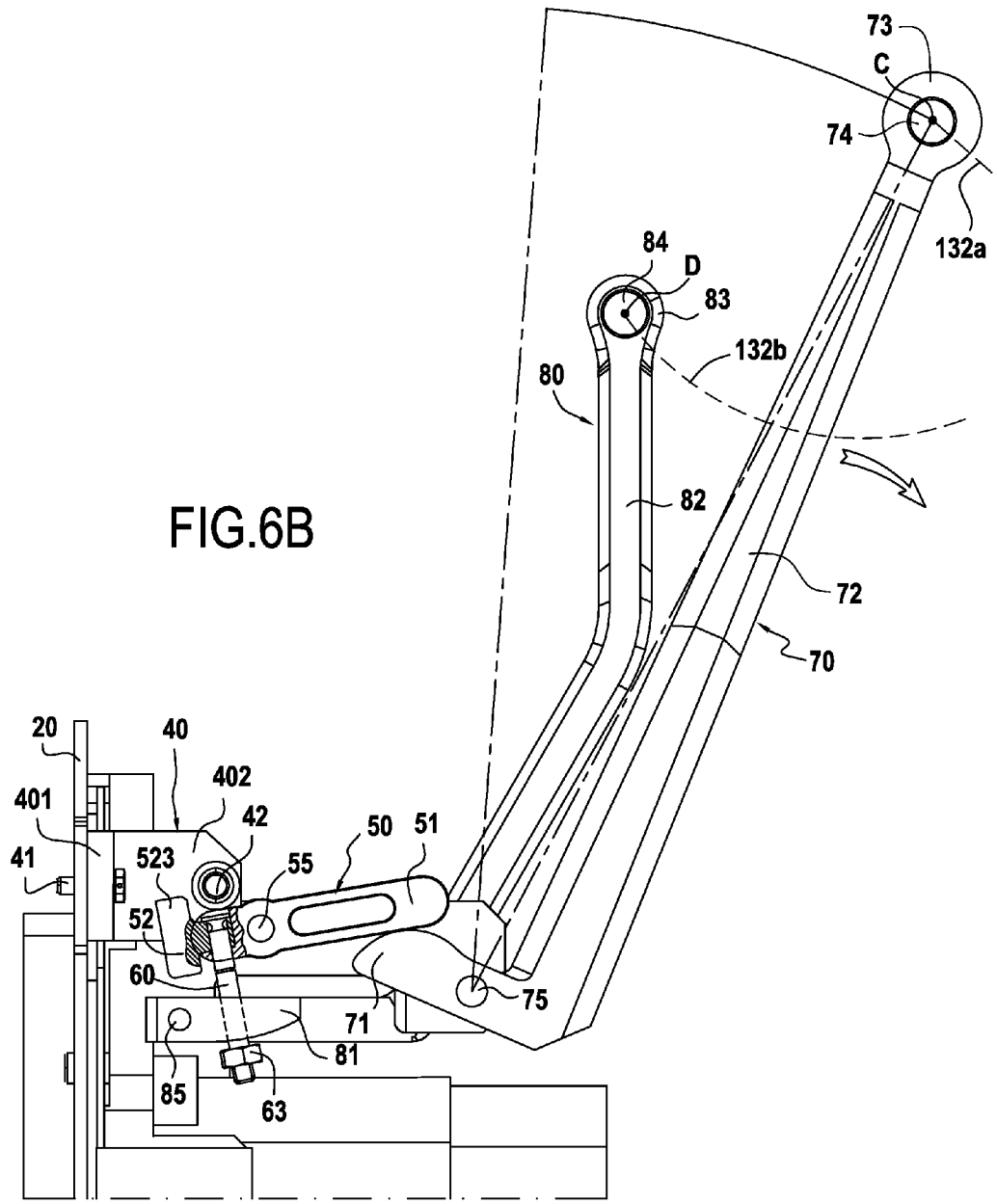
Figure 6C:
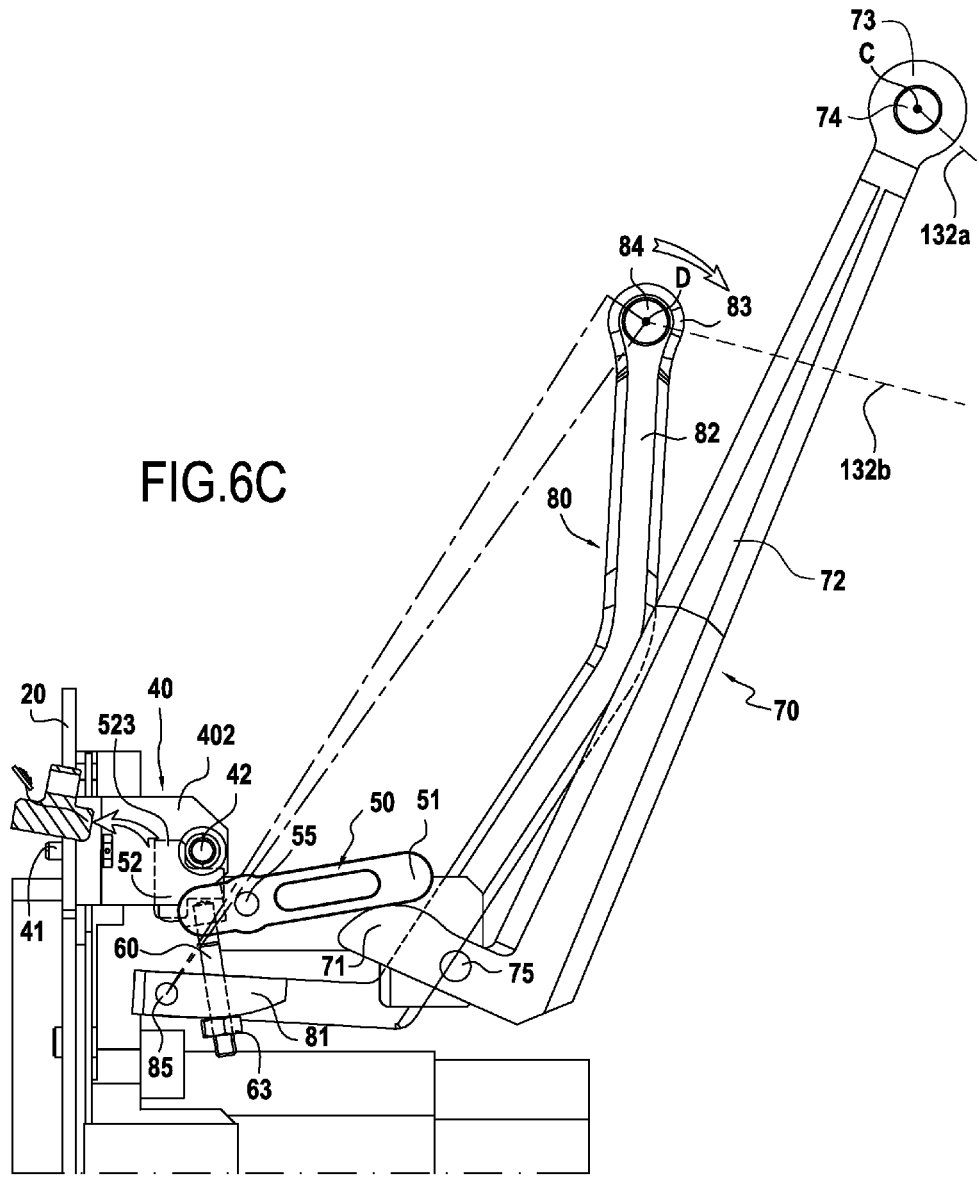

FIGS. 6A to 6C show the various steps of separating the on-board and ground portions of the module in an embodiment of the invention.

FIG. 6A shows the device for separating the on-board and ground portions of the module 20 while it is in its locked position. In this position, the cables in the set of cables 13 are slack. The blocking portion 523 of the locking finger 50 blocks movement of the ground portion 22 of the module 20 by means of the locking pin 42. When the engines of the launcher 10 start operating and the launcher begins to lift off, the first cable segment 132a becomes progressively tensioned and, when the launcher 10 has lifted off through a first height H1, the set of cables 13 including the cable segment 132a is fully tensioned and the drive lever 70 is actuated under the effect of the traction force from the set of cables 13. This stage is shown in FIG. 6B. While the drive lever 70 is being lowered, it pivots about its pivot axis 75 in a clockwise direction and the head 71 of the drive lever 70 comes to press against the bottom face of the first segment 51 of the locking finger 50. In this way, the locking finger 50 pivots counterclockwise about its pivot axis 55, thereby disengaging the blocking portion 523 of the locking pin 42 and enabling the on-board and ground portions 21 and 22 of the fueling module 20 to be separated. It should be observed that in order to allow the bolt 60 that is secured to the locking finger 50 to pivot freely when the locking finger 50 pivots under the action of the drive lever 70, the bottom portion of the fork 81 has a curved profile. In this way, the nut 63 screwed onto the end of the bolt 60 can move along the curved portion of the fork 81 without impeding pivoting of the pin 60 and thus of the locking finger 50.

In the possible circumstance of the drive lever 70 being blocked while it is being actuated, (i.e. in the event of it failing) and in the absence of any safety device, it would be impossible to ensure proper separation of the on-board and ground portions of the fueling module, and under certain circumstances that might cause considerable damage to the launcher. In order to mitigate that possibility, the extraction lever 80 is provided as second actuation means capable of separating the two portions of the fueling module 20 in the event of the drive lever 70 malfunctioning or being blocked.

The extraction lever 80 is actuated automatically after the drive lever 70 under the effect of traction forces from the set of cables 13. As it continues to lift off after actuating the drive lever, the launcher 10 tensions the second cable segment 132b connected to the knob 83 of the extraction lever 80. Thus, at a second lift-off height H2 of the launcher 10, higher than the height H1, the extraction lever 80 is lowered. The extraction lever 80 then pivots clockwise about its pivot pin 85, thereby turning the fork 81. As it moves, the fork 81 applies a traction force on the bolt 60 via the nut 63 until it is fully extracted from the locking finger 50. By way of example, bolt 60 may have a rupture zone 64 in the vicinity of its head 61 (cf. FIG. 4), which zone is suitable for breaking as soon as traction is applied. In another embodiment, the bolt 60 may be removable. Once the bolt 60 has been extracted from the locking finger 50, as shown in FIG. 6C, the connection between the first and second segments of the locking finger 50 is no longer provided. Consequently, the second segment 52 of the locking finger 50 becomes detached and the ground portion 22 of the module 20 is released by the blocking portion 523. The ground portion 22 of the module 20 then tilts relative to the on-board portion 21 under the combined action of an ejector, if any, and of the set of cables 13. An ejector enables the ground portion 22 of the module 20 to be removed more quickly from the launcher 10 and encourages mutual tilting between the two portions 21 and 22. The titling of the ground portion 22 causes the support shear pins 30 located in the bottom portion of the module 20 to break quasi-simultaneously by traction and bending.

Tilting is also made easier by a pivot zone 90 (shown in FIG. 7) that is provided on the bottom portions of the on-board support plate 210 and the ground support plate 220.

As shown in FIG. 7, the pivot zone 90 is constituted by a longitudinal projection of semicylindrical section 91 formed on the on-board support plate 210 and by a longitudinal projection of rectangular section 92 formed on the ground support plate 220, facing the projection 91. In a variant embodiment, the pivot zone may also be constituted by one or more semicircular projections formed on the on-board portion and one or more rectangular profile projections provided on the ground portion and located, after assembly, facing one or more of said semicircular projections. Contact between the plane face 920 of the projection 92 and the convex surface 910 of the projection 91 allows rotation and possibly relative pivoting (see arrow R in FIG. 7) between the ground portion 22 and the on-board portion 21.

FIG. 7 is a section view of the bottom portion of the module 20. Contact between the projection 91 on the on-board portion and the projection 92 on the ground portion is represented in FIG. 7 by a point M situated on the middle axis B of the projections 91 and 92. In reality, when the projections 91 and 92 extend longitudinally in the direction Y-Y', the contact zone between the projections 91 and 92 may be a line. In the description below, the distance between the contact point M (more generally the contact zone) between the projections 91 and 92 and the middle axes A of the shear pins 30 is written l. Furthermore, the distance between the point of contact M (more generally the zone of contact between the projections 91 and 92) and the axis of one of the knobs 74 and 84 is written L. In normal operation, consideration is given to the axis C of the knob 74 of the drive lever 70, and in the event of a breakdown, consideration is given to the axis D of the knob 84 of the extraction lever 80. The shear pins are easier to break when the ratio L/l of the distances is large.

In order to avoid problems of possible static redundancy, it is necessary to provide some minimum amount of clearance between the two portions of the module, which clearance may be located for example in the pivot zone 90 between the on-board projection 91 and the ground projection 92, as shown in FIG. 8. Assembly is made easier when the clearance J is large. However, the greater the clearance J, the longer it takes to achieve separation between the on-board and ground portions. Depending on requirements (speed of separation between the two portions of the module, limiting costs, . . . ), it is therefore appropriate to find a compromise between the ratio L/l and taking up the clearance J between the on-board and ground portions of the module (where said clearance should be close to 0, where possible). In another embodiment, it is also possible to adjust the tilting zone so as to take up the clearances or to make the device using parts that are selected for very small clearance.

The separator device is thus actuated in two stages. The drive lever 70 is actuated when the launcher 10 reaches a first lift-off height H1, and the extraction lever 80 is actuated automatically after the drive lever 70 at a lift-off height H2 that is higher than H1, such that even in the event of the drive lever 70 not operating, it is ensured that the two portions 21 and 22 of the fueling module 20 are separated. The increase in the breaking force due to the traction on the cables is provided firstly by the action of the levers 70 and 80, and secondly by the pivot zone 90 in the bottom portion of the module 20.

From the above description, it will be understood that in normal operation the drive lever 70 suffices on its own to disengage the blocking portion 523 from the locking pin 42. In other words, it serves to disengage the blocking portion 523 from the locking pin 42 independently of the extraction lever 80.

It will also be understood that the extraction lever 80 also serves to disengage the blocking portion 523 from the locking pin 42 even in the event of the drive lever 70 not operating. Thus it too, on its own and independently of the drive lever 70 enables the blocking portion 523 to be disengaged from the locking pin 42.

The invention claimed is:

1. A separator device for separating the on-board and ground portions of a launcher fueling module, the device comprising:
 a locking system having a locking finger mounted on the ground portion and having a blocking portion, and a locking pin on the on-board portion co-operating by engaging with the blocking portion in order to hold the on-board portion and the ground portion in a locking position; and
 an actuation system that, under vertical movement of the launcher, enables the blocking portion to be disengaged from the locking pin, whereby the on-board portion is suitable for being separated from the ground portion,
 wherein said actuation system comprises a first actuator and a second actuator capable, independently of each other, of disengaging the blocking portion from the locking pin, and said second actuator is actuated after said first actuator.

2. The separator device according to claim 1, wherein the second actuator serves to disengage the blocking portion from the locking pin, thereby constituting a safety element enabling the two portions of the launcher fueling module to be separated.

3. The separator device according to claim 1, wherein:
 the actuation system comprises a drive lever pivotally mounted on the ground portion;
 the locking finger is pivotally mounted on the ground portion; and
 the pivoting of the drive lever is suitable for driving pivoting of the locking finger, thereby disengaging the blocking portion from the locking pin secured to the on-board portion.

4. The separator device according to claim 1, wherein the locking finger is constituted by a first segment mounted on the ground portion and a second segment including said blocking portion, the first and second segments being connected together by means of a connection element.

5. The separator device according to claim 4, wherein the actuation system comprises an extraction lever pivotally mounted on the ground portion and including a fork co-operating with the connection element of the locking finger in such a manner as to force movement of the connection element during actuation of the extraction lever and to extract the connection element from the locking finger, whereby the first and second segments of the locking finger can be separated from each other.

6. The separator device according to claim 5, wherein the fork has a slot in which a middle portion of the connection element is engaged, and the connection element is breakable or removable and includes at its bottom end an enlarged end portion projecting at the underside of the fork.

7. The separator device according to claim 6, wherein the connection element is a bolt, and the enlarged end portion is constituted by a nut screwed onto the bottom end of the bolt.

8. The separator device according to claim 5, wherein the actuation system is connected to the launch pad via a cable, and is suitable for being actuated under the effect of traction from the cable when the launcher moves vertically through a predetermined distance.

9. The method of separating the on-board and ground portions of a launcher fueling module by means of the separator device according to claim 8 taken together, said method comprising the following steps:
   a) initiating vertical movement of the launcher;
   g) actuating the extraction lever under the effect of the traction force from the cable when the launcher has lifted off through a predetermined distance;
   h) forcing the connection element to move by pivoting the extraction lever until the connection element is fully withdrawn from the locking finger; and
   d) continuing the vertical movement of the launcher, whereby the on-board and ground portions of the module are separated.

10. The separator device according to claim 4, wherein the connection element is a bolt.

11. The separator device according to claim 10, wherein the bolt has a head serving to position the bolt between the two segments of the locking finger and suitable for being broken when the bolt is extracted from the locking finger.

12. The separator device according to claim 1, wherein the first actuator is in the form of a drive lever, and the second actuator is in the form of an extraction lever.

13. The separator device according to claim 12, wherein:
   the drive lever is pivotally mounted on the ground portion;
   the locking finger is constituted by a first segment pivotally mounted on the ground portion and a second segment including said blocking portion, the first and second segments being connected together by means of a connection element;
   the pivoting of the drive lever is suitable for driving pivoting of the locking finger, thereby disengaging the blocking portion from the locking pin; and
   the extraction lever is pivotally mounted on the ground portion and includes a fork co-operating with the connection element of the locking finger in such a manner as to force vertical movement of the connection element during actuation of the extraction lever and to extract the connection element from the locking finger, whereby the first and second segments of the locking finger can be separated from each other.

14. The separator device according to claim 13, wherein:
   the fork has a slot in which a middle portion
of the connection element is engaged; and
   the connection element is breakable or removable and includes, at its bottom end, an enlarged end portion projecting at the underside of the fork, actuation of the extraction lever enabling the connection element to be extracted from the locking finger and thereby releasing the connection between the second segment of the locking finger and the ground portion of the fueling module.

15. The separator device according to claim 13, wherein the bottom surface of the fork of the extraction lever has a rounded shape enabling the connection element to pivot in the event of the drive lever being actuated prior to the extraction lever being actuated.

16. The separator device according to claim 13, wherein the actuation system is connected to the launch pad via a cable, and is suitable for being actuated under the effect of traction from the cable when the launcher moves vertically through a predetermined distance.

17. The method of separating the on-board and ground portions of a launcher fueling module by means of the separator device according to claim 16, said method comprising the following steps:
   a) initiating vertical movement of the launcher;
   e) actuating the drive lever under the effect of the traction force from the cable when the launcher has lifted off through a first predetermined distance, so as to cause the locking finger to pivot;
   g) actuating the extraction lever under the effect of the fraction force from the cable when the launcher has lifted off through a predetermined distance higher than the first distance;
   h) forcing the connection element to move by pivoting the extraction lever until the connection element is fully withdrawn from the locking finger; and
   d) continuing the vertical movement of the launcher, whereby the on-board and ground portions of the module are separated.

18. The separator device according to claim 1, wherein the actuation system is connected to the launch pad via a cable, and is suitable for being actuated under the effect of traction from the cable when the launcher moves vertically through a predetermined distance.

19. The separator device according to claim 1, including a system for positioning the on-board and ground portions of the module relative to each other, said system being in the form of support shear pins fastened to the two portions of the module and suitable for being broken during separation of the two portions of the module.

20. The separator device according to claim 1, wherein a pivot zone is provided at the bottom portions of the on-board and ground portions, said pivot zone comprising a first pivot portion formed on the on-board portion and a second pivot portion formed on the ground portion, with contact between the first and second pivot portions enabling pivoting and/or relative movement in translation of the ground portion relative to the on-board portion of the module.

* * * * *